Jan. 15, 1929.
J. H. D. PETERSEN
1,699,334
SCRAPER ATTACHMENT FOR CHAIN BELTS
Filed Sept. 7, 1926
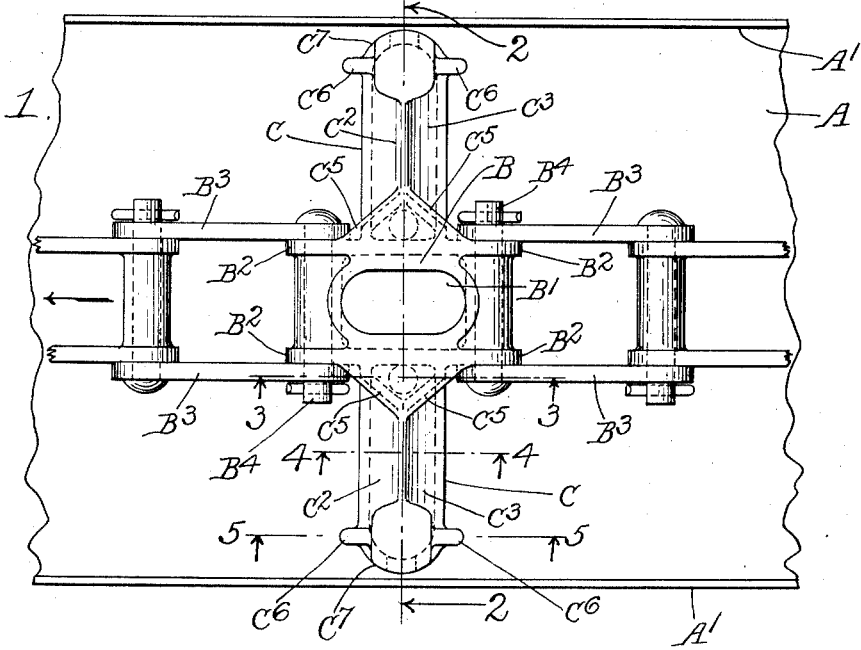
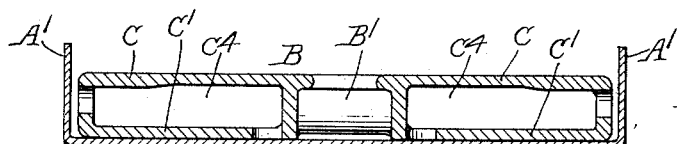
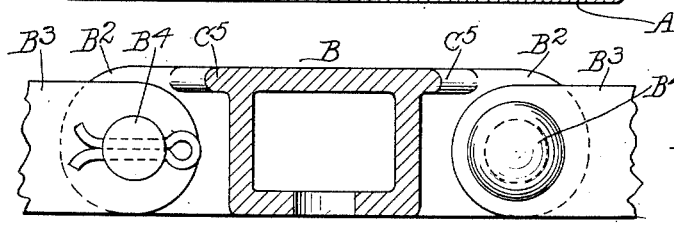
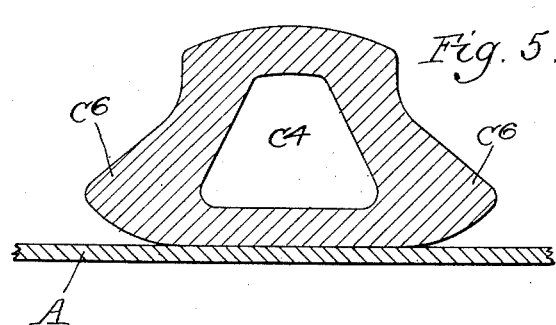
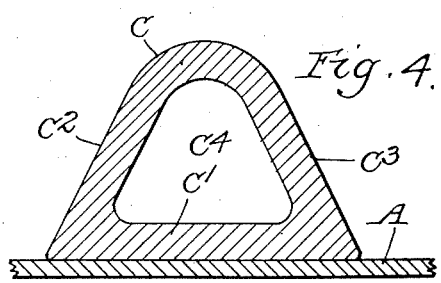
Inventor
John H. D. Petersen
by Parker & Carter
Attorneys.

Patented Jan. 15, 1929.

1,699,334

UNITED STATES PATENT OFFICE.

JOHN H. D. PETERSEN, OF CHICAGO, ILLINOIS, ASSIGNOR TO LINK-BELT COMPANY, OF CHICAGO, ILLINOIS, A CORPORATION OF ILLINOIS.

SCRAPER ATTACHMENT FOR CHAIN BELTS.

Application filed September 7, 1926. Serial No. 133,880.

My invention relates to a scraper attachment for chain belt and particularly to a scraper adapted to be connected in a chain or chain belt. One object is the provision of a scraper which will not wedge in the sides of a conveyor trough. Another object is the provision of a scraper or flight of such a form as to be forced, by the material it engages, into contact with the bottom of the trough. Another object is the provision of wearing lugs or chutes to permit the scraper to ride over irregularities. Another object is the provision of a flight which will shear or break off in case of obstruction. Other objects will appear from time to time in the course of the specification and claims.

I illustrate my invention more or less diagrammatically in the accompanying drawings, wherein—

Figure 1 is a plan view;

Figure 2 is a section on the line 2—2 of Figure 1; and

Figures 3, 4 and 5 are sections on an enlarged scale along the lines 3—4—5 respectively of Figure 1.

Like parts are indicated by like symbols throughout the specification and drawings.

A generally indicates a conveyor trough which may have the side members $A^1$.

B generally indicates a link member centrally cored as at $B^1$, and $B^3$ $B^3$ are intermediate link members through the ends of which are intermediate link members embracing the link B, through the ends of which and through the embraced ends of the link B pass the securing pins $B^4$. Formed integrally with the link member B is a scraper flight having the outwardly projecting scraper members C, C, each of which is bounded by a bottom wall $C^1$, a forward inclined wall $C^2$ and a rear inclined wall $C^3$ surrounding the cored center $C^4$. $C^5$ are securing or connecting webs extending from the upper portion of the scrapers C to the side elements $B^2$ of the link B. $C^6$ are forwardly and rearwardly projecting lugs or wearing shoes, the cross-section of which is shown in Figure 5, which serve to permit the chain to override irregularities in the trough or connections between trough sections. The ends of the flights terminate in rounded portions $C^7$ which serve to prevent the flight from wedging in the sides of the conveyor trough.

It will be realized that whereas I have shown a practical and operative device nevertheless many changes might be made in the size, shape, number and disposition of parts without departing from the spirit of my invention and I therefore wish my drawings to be taken as in a broad sense illustrative and diagrammatic rather than as limiting me to my specific showing.

The use and operation of my invention are as follows:

I have invented a scraper attachment for chain belt which is adapted to be attached, as a link, in any suitable conveyor or track chain. The material to be conveyed may be fed in any suitable manner to the trough A along which chain of which the link B forms a part may be drawn by motive means not herein shown and forming no part of the present invention. The scraper link, being flat bottomed, rests on the bottom of the trough. As it moves against the material being conveyed, the material, thrusting against the forwardly inclined face $C^2$ or $C^3$, forces the link downwardly against the bottom.

The ends of the flight being rounded there is no tendency for it to wedge between the sides of the conveyor trough as may be the case in a square ended flight of any substantial width. The lugs $C^6$, being forwardly projected and upwardly turned, serve to override whatever irregularities there may be in the bottom of the trough and make it possible to run the chain over a trough wherein the connections between sections may be poor or irregular. Furthermore these lugs have a tendency to force the material to the center upon the main chain and thereby tend to reduce friction between the material conveyed and the trough.

Both the link section proper and the outwardly projecting scraper members are cored to reduce their weight. Furthermore the scraper attachments are so designed as to shear or break off, in case the chain hits an immovable object or is subjected to abnormal strain, leaving the main conveyor chain intact. The bottom of the flight being closed by the plane portion $C^1$, on the return run, when the chain is inverted, there will be no tendency for the flights or scrapers to carry material back with them.

I claim:

1. In a scraper attachment for chain belt, a link body, scraper members laterally projecting therefrom and forwardly and rearwardly extending wearing lugs projecting from the scraper members along the plane of travel of the belt.

2. In a scraper attachment for chain belt, a link body, scraper members laterally projecting therefrom and upwardly curved wearing lugs projecting from the scraper members along the plane of travel of the belt, said lugs being upwardly and outwardly curved from the lower edges of said scraper members.

3. In a scraper attachment for chain belt, a link body, scraper members laterally projecting therefrom and forwardly and rearwardly extending wearing lugs projecting from the scraper members along the plane of travel of the belt, said lugs being upwardly and outwardly curved from the lower edges of said scraper members.

4. In a scraper attachment for chain belt, a link body and a scraper flight having an upwardly and rearwardly inclined forward face, and a longitudinally extended plane surfaced bottom.

5. In a scraper attachment for a chain belt, a centrally disposed body portion conforming generally in width to the chain with which it is employed, wings laterally extending from each side thereof, the bottoms of said wings and said body portion lying in a single plane, said wings being of generally triangular cross-section throughout a substantial proportion of the length.

6. In a scraper attachment for a chain belt, a centrally disposed body portion conforming generally in width to the chain with which it is employed, wings laterally extending from each side thereof, the bottoms of said wings and said body portion lying in a single plane, said wings being of generally triangular cross-section throughout a substantial proportion of their length, and terminating in end portions bounded by arcs connecting the front and rear edges of the wings.

7. In a scraper attachment for a chain belt, a centrally disposed body portion conforming generally in width to the chain with which it is employed, hollow wings laterally extending from each side thereof, the bottoms of said wings and said body portion lying in a single plane, said wings being of generally triangular cross-section throughout a substantial proportion of their length.

8. In a scraper attachment for a chain belt, a link body conforming generally to the width of the chain with which it is employed, and scraper members laterally projecting from each side thereof, such members including connected wall portions longitudinally spaced along and projecting outwardly from the link body, the bottoms of said wings and body portion lying in a single plane.

9. In a scraper attachment for a chain belt, a cored link body and cored scraper members laterally projecting from each side thereof, each such scraper member including a flat closed bottom and front and rear upwardly inclined converging walls the bottoms of the scraper members and body lying in a single plane.

Signed at Chicago, county of Cook and State of Illinois, this 26th day of August, 1926.

JOHN H. D. PETERSEN.